United States Patent
Suppiah

(10) Patent No.: US 7,950,505 B2
(45) Date of Patent: May 31, 2011

(54) MECHANICALLY VENTILATED DISC BRAKE ROTOR

(75) Inventor: Sivashanumugam Suppiah, Ampang (MY)

(73) Assignee: Paruvathy Arumugam, Ampang, Selangor (MY)

( * ) Notice: Subject to any disclaimer, the term of this patent is extended or adjusted under 35 U.S.C. 154(b) by 534 days.

(21) Appl. No.: 12/141,095

(22) Filed: Jun. 18, 2008

(65) Prior Publication Data

US 2009/0314591 A1    Dec. 24, 2009

(51) Int. Cl.
*B61H 5/00* (2006.01)
(52) U.S. Cl. ....... 188/264 AA; 188/264 A; 188/218 XL; 188/264 R
(58) Field of Classification Search ............ 188/218 XL, 188/264 A, 264 AA, 264 B, 264 D, 264 F, 188/264 R, 71.6
See application file for complete search history.

(56) References Cited

U.S. PATENT DOCUMENTS

| | | | | |
|---|---|---|---|---|
| 2,827,142 A | * | 3/1958 | Aschauer | 192/70.12 |
| 4,363,000 A | * | 12/1982 | Aurand | 330/56 |
| 7,281,613 B2 | * | 10/2007 | Weiss | 188/264 A |

* cited by examiner

*Primary Examiner* — Melanie Torres Williams

(57) ABSTRACT

A mechanically ventilated disc brake rotor has internally housed centrifugal fan impeller rotates freely at one direction and engages with brake rotor in other direction with use of single direction ball bearing. While a vehicle travelling forward, centrifugal fan impeller rotates along with brake rotor at same speed and forces airflow out through the fixed vanes passages by centrifugal action and at the same time it gains angular momentum energy. Whenever brake's applied to slow down a forward moving vehicle, the rotation of brake rotor slows down. At this instant, single direction bearing gets disengaged from the brake rotor and continue rotating freely at same initial rotational speed with help of angular momentum effect. Continues rotation of centrifugal fan impeller, continue in forcing out air flow thru fixed vanes channels by centrifugal action providing enhanced and continues heat dissipation even though brake rotor rotation speed has slowed down or stopped.

11 Claims, 3 Drawing Sheets

MECHANICALLY VENTILATED DISC BRAKE ROTOR

FIELD OF THE INVENTION

The present invention relates to a mechanically ventilated disc brake rotor with internally housed centrifugal fan impeller which rotates freely at one direction and get engaged or locked in other direction with use of one way clutch ball bearing or single direction ball bearing.

BACKGROUND OF THE INVENTION

Wheeled vehicles, such as automobiles, etc, frequently include disc brake systems for slowing the motion of the vehicle. These brake systems include a rotor that rotates with the wheel to be braked. Brake pads mounted on non-rotating calipers pressed against the brake disc rotor to affect braking of the vehicle. The resultant friction converts the rotational energy or kinetic energy of the moving vehicle to thermal energy.

As a result of this energy conversion, the friction generates a substantial amount of heat each time the brake pads are applied to the rotor. The temperature of the rotor can rise significantly following frequent frictional contact between the brake pads and the rotor. It is well known that the performance of disc brake systems will deteriorate as temperature of the brake system increases.

The heat generated causes an increase in the temperature of the brake rotor and the brake pads and the brake caliper. Thermal conduction and radiation also heat up the components in the caliper such as piston, brake fluid and piston seals which isolate the brake fluid from the environment Exposure to excessive temperature can deteriorate the piston seals causing brake fluid to leak out and also will allow air to enter into the brake fluid circuit.

It is therefore desirable to keep the brake systems cooler to optimize performance of the brake system. Various methods have been utilized for this purpose. The prior arts include various types of vented disc brake rotors with fixed ventilation vanes arrangement with the cooling ability of the vanes depends largely upon the quantity of air flowing through them to dissipate the generated heat effectively. In order to achieve this, the rotor has to rotate at substantially high speed to maintain sufficient amount of forced air thru the fixed vanes passages by centrifugal action during rotation of the brake rotor when the vehicle is moving.

But however, as the brake rotor rotation speed reduces during braking process, the centrifugal airflow volume also reduces substantially and thus slows down the heat dissipation rate or causing the heat removal process ineffective. This situation further worsen under frequent braking condition where the rotor temperature tends to rise significantly to overheating condition and deteriorating the performance of the braking system leading to an unsafe driving condition.

The present invention was developed to attempt to provide improved ventilation system to a brake rotor by providing additional mechanical ventilation with use of additional centrifugal fan impeller housed inside the brake rotor. The centrifugal fan impeller rotates freely at one direction and get engaged or locked with rotor in other direction of rotation.

One way direction rotation is achieved by using single direction ball bearing which allows the centrifugal fan impeller to rotate freely at one direction only and does not allow the centrifugal fan impeller to rotate in the opposite direction. The same principle applies to bicycle chain sprocket where the sprocket in form of single direction bearing gets engaged with the wheel when the rider pedals to move the bicycle forward. While the bicycle moving forward, the sprocket or the single direction bearing disengages the pedal from the wheel when the rider stops pedaling.

SUMMARY OF THE INVENTION

The present invention provides a mechanically ventilated disc brake rotor with internally housed centrifugal fan impeller which rotates freely at one direction and engaged or locked in other direction with use of single direction rotation bearing.

The main components of this mechanically ventilated disc brake rotor are brake rotor with annularly spaced fixed vanes, centrifugal fan impeller, single direction ball bearing and end cap. The centrifugal fan impeller and the single direction ball bearing are housed inside the hub of the brake rotor and covered with end cap and mounting fasteners.

The single direction ball bearing is placed inside the brake rotor in such rotation direction to allow the centrifugal fan impeller to engage and rotate along with brake rotor when vehicle is moving forward. A centrifugal fan impeller operates on the same principle as a centrifugal pump, converting rotational mechanical energy into fluid or air energy.

When a vehicle begins to move forward from stationary state, the centrifugal fan impeller gets engaged with brake rotor by single direction bearing and allows the centrifugal fan impeller to rotate at the same rotational speed of the brake rotor and the wheel. At this condition, the centrifugal fan impeller which rotates at same rotational speed with brake rotor forces the air out through the fixed vanes passages by centrifugal action. The fixed vanes which are spaced annularly also shall assist further in forcing out the air out of vanes passages by centrifugal action.

While the centrifugal fan impeller rotates along with the brake rotor, it gains angular momentum energy at a level which is directly proportional with the rotational speed and the mass of the centrifugal fan impeller assembly.

When the brake is applied to slow down or stop a vehicle moving forward, the rotation of brake rotor gradually slows down. At this instant, the single direction bearing gets disengaged from the brake rotor and continue to rotate freely at the same initial rotational speed with help of the angular momentum effect. Continues rotation of the centrifugal fan impeller, continue in forcing out the air flow thru fixed vanes channels by centrifugal action, providing enhanced and continues heat dissipation even though the brake rotor rotation speed has slowed down or stopped. This improved heat dissipation is essential to remove the unwanted heat generated during braking action more quickly to maintain the performance of braking system to an optimum level especially under frequent braking condition.

While the invention is defined in the claims explained previously, additional understanding of the invention can be gained by referencing the following brief description of the drawings, detailed description of the preferred embodiments and the attached drawings.

BRIEF DESCRIPTION OF THE DRAWINGS

An embodiment of the present invention is illustrated in the drawings and described hereinafter.

DETAILED DESCRIPTION OF PREFERRED EMBODIMENTS

Figure 1:
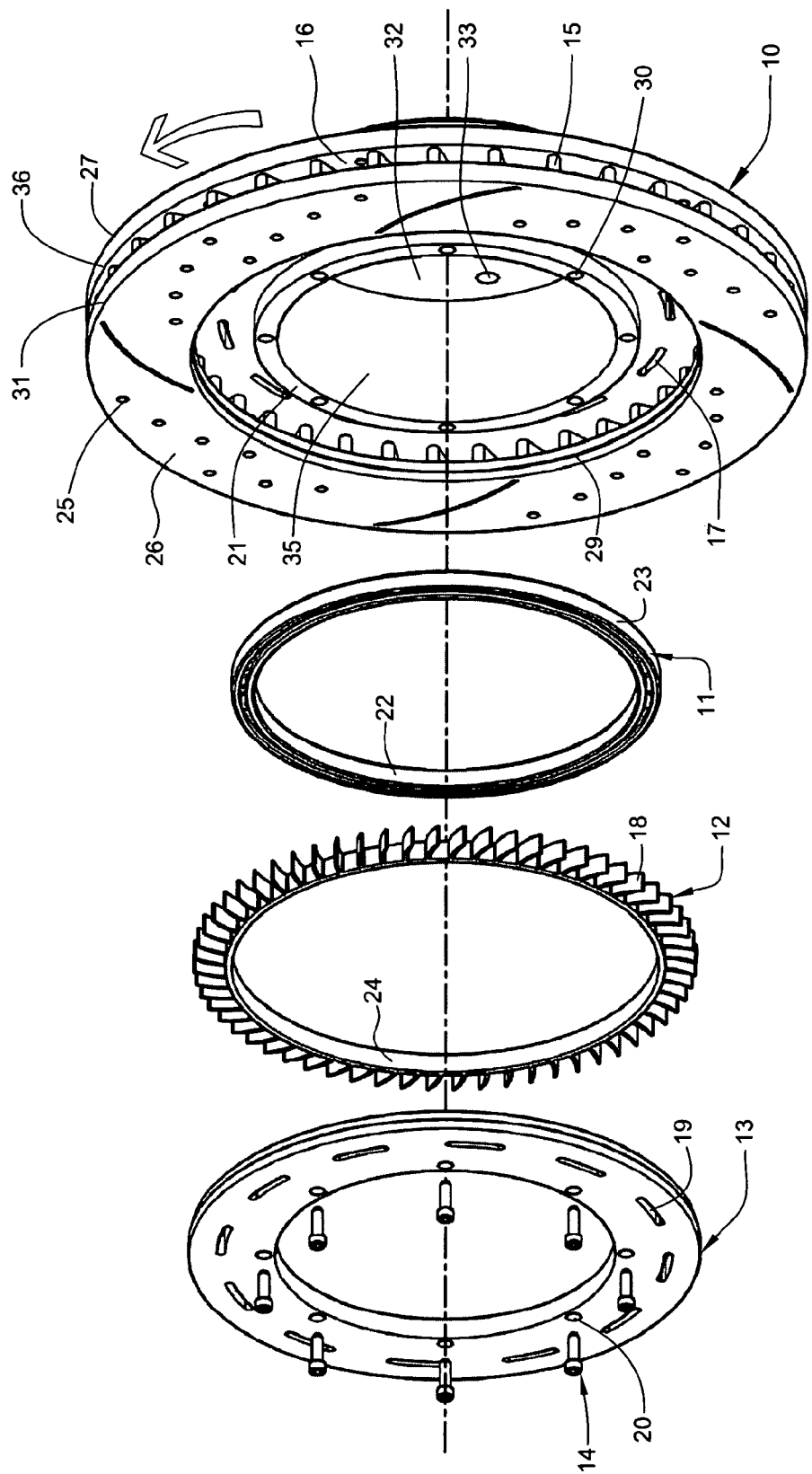
FIG. 1 is an exploded isometric view showing the brake rotor, single direction ball bearing, centrifugal fan assembly, end cap and mounting fasteners.
Figure 2:
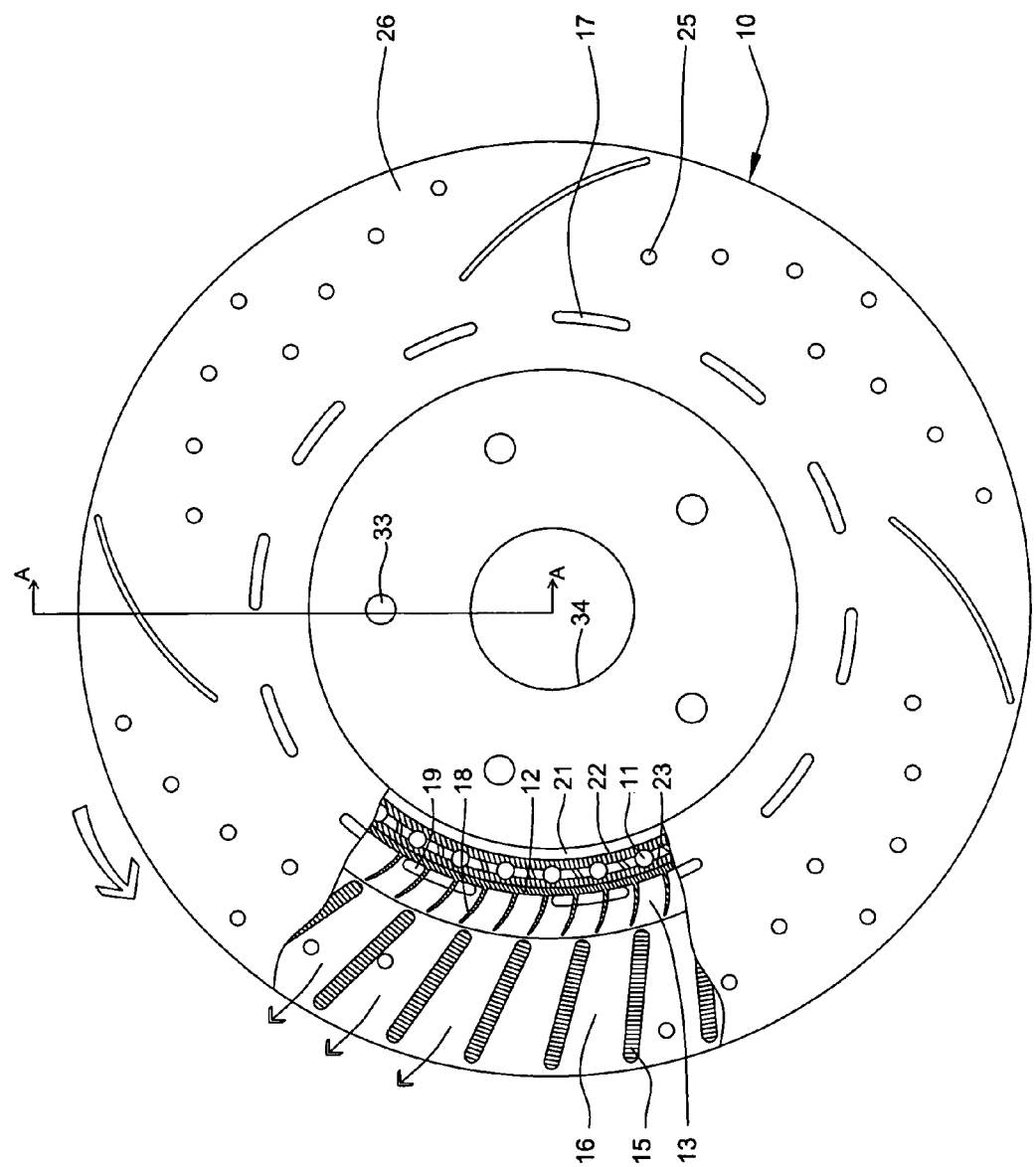
FIG. 2 is an elevation view of FIG. 1, in assembled form.
Figure 3:
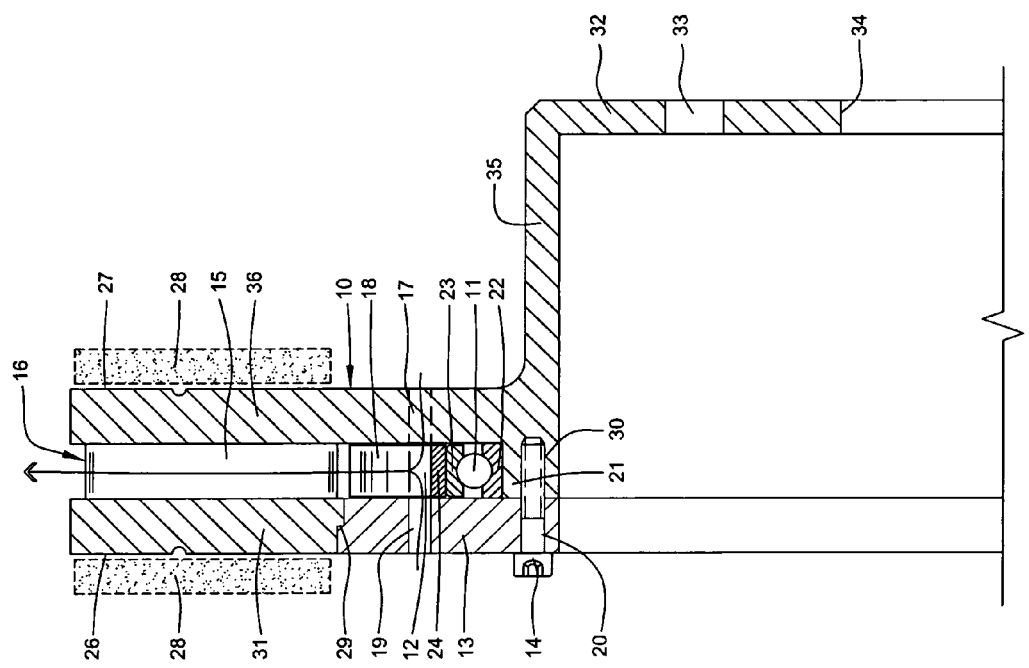
FIG. 3 is a view thru Section A-A of the brake rotor depicted in FIG. 2.

FIGS. 1, 2 and 3 of the drawing generally indicates the embodiment of a mechanically ventilated disc brake rotor according to the invention. Rotor 10 includes a hub 35 having generally cylindrical body ending axially outwardly from a radially inwardly extending ring 32 having openings 33 for mounting bolts attachment of the hub 34 to a wheel spindle of a vehicle.

An annular brake disc 36 is carried by the hub 35 at its inner end. The brake disk 36 includes number of support vanes 15 angularly spaced, which are connecting annular outboard brake disc 36 and inboard brake disc 31 together. Both disc 36 and 31 are connected axially to either side of ring of angularly spaced vanes 15 to define a plurality of angularly spaced radial air vent channels or passages 16. The passages 16 provide channels for radial air flow from the inner diameter to the outer diameter of the disc 36 and 31.

The disc 36 and 31 has outer surfaces 26 and 27 adapted to be engaged by the brake pads 28 of a disk brake mechanism not shown. In the present invention, inlet air flow to the centrifugal fan impeller 12 is provided thru air inlet ports 17 and 19.

The single direction ball bearing 11 inner race 22, attached in the hub 35 cylindrical ring 21 ending axially inward. The single direction ball bearing 11 placed in such rotation direction that it will get engaged or locked with the outer race 23 when the brake rotor 10 rotates in vehicle forward direction. When the rotor 10 slows down or stops rotating, the single direction ball bearing 11 outer race 23 gets disengaged and continues rotating freely.

The centrifugal fan impeller 12 base 24 is attached with the single direction bearing 11 outer race 23. The centrifugal fan impeller 12 with fan blades 18 in backward curved configuration fixed in placed with fan blade 18 tips pointing toward opposite direction of brake rotor 10 forward rotation.

Single direction ball bearing 11 and centrifugal fan impeller 12 are attached to the cylindrical ring 21 extending axially from the hub 35 with end cap 13 placed against cylindrical ring 21 end surface and inboard brake disc inner circumferential matching surface 29 and secured with mounting fasteners 14 via bolts holes 20 and female thread on the cylindrical ring 21. Inlet air flow to the centrifugal fan impeller 12 is provided thru air inlet ports 19 on end cap 13 and ports 17 on the outboard brake disk 36. The double inlet air ports 17 and 19 at both sides are angularly staggered to enable unobstructed continues air flow intake by entire centrifugal fan impeller 12 fan blades 18 enabling evenly distributed air flow out from centrifugal fan impeller 12 for uniform heat dissipation from both inboard 31 and outboard brake disc 36. Cross drilled holes 25 improves air circulation thru ventilation passages 16 for enhanced heat dissipation.

In operation of all the embodiments described, rotation of the brake rotor as the vehicle moves forward causes the angularly spaced fixed vanes embodiments to act as impellers which, through centrifugal action, cause air to flow radially outward through the respective passages of the brake rotor. In addition to this, the centrifugal fan impeller which is housed in the hub of the brake rotor rotates at same rotation speed with brake rotor, through centrifugal action, provides additional air flow, forcing air to flow radially outward to the fixed vanes section. Intake air drawn into centrifugal fan impeller via intake ports provided at both sides of the brake rotor.

The enhanced air flow generated by centrifugal action of both centrifugal fan impeller and fixed vanes passing through the fixed vanes passages cools the rotor effectively during vehicle travelling generally under cruising speed condition.

While the vehicle traveling forward, the centrifugal fan impeller rotates along with the brake rotor and gains angular momentum energy which is directly proportional with the rotational speed and the mass of the centrifugal fan impeller assembly.

When the brake is applied to slow down or stop a vehicle travelling forward, the rotation of brake rotor gradually slows down. At this instant, the single direction bearing gets disengaged front the brake rotor and continues to rotate freely at the same initial rotational speed with help of the angular momentum energy. Continues rotation of the centrifugal fan impeller allows continues air flow thru fixed vanes channels by centrifugal action providing continues heat dissipation from the brake rotor. This continues heat dissipation is essential to remove the unwanted heat generated during braking action more quickly to maintain the brake rotor temperature generally at lower operating range to maintain the performance of braking system to an optimum level especially under frequent braking condition. The centrifugal fan impeller continues rotating and slows down gradually as the angular momentum energy level drops gradually.

When the vehicle start to accelerate forward once again, the centrifugal fan impeller gets engaged with brake rotor by single direction ball bearing and start gaining angular velocity and angular momentum and gets ready for next braking and cooling cycle.

What is claimed is:

1. A mechanically ventilated disc brake rotor comprising:

A rotor having a hub rotatable on an axis, an annular outboard brake disc carried by the hub and connected with inboard annular brake disc with a series of inclined fixed vanes distributed radially around the rotor to form air vent channels or air vent passages wherein;

A series of inclined fixed vanes distributed radially around the rotor between the outboard and inboard brake disks forming a series of air flow passages between each adjacent pair of fixed vanes, wherein the air flow passages have an inlet and an outlet areas;

A centrifugal fan impeller attached to the hub in between the inboard and outboard brake disc space with a single direction rotation ball bearing or a clutch bearing to allow the centrifugal fan impeller to rotate freely at a one-way direction wherein;

The single direction bearing inner race is attached to the brake rotor hub while the outer race is attached to the centrifugal fan impeller which allows it to rotate at a one-way direction inline with vehicle forward moving direction and the bearing is provided with a weather seal to prevent the bearing from losing its lubricant and/or being contaminated with dirt;

And an end cap provided to house the centrifugal fan impeller and the single direction bearing in the brake rotor hub attached with mounting fasteners.

2. A mechanically ventilated disc brake rotor according to claim 1 wherein the fixed vanes attached between inboard and outboard brake discs functions as a conventional vented disc brake rotor wherein the rotation of the disc brake rotor causes the inclined fixed vanes to act as impellers which through centrifugal action, forces air to flow radiallly outward through vanes passages to dissipate the heat that generated on the disc brake rotor by the contact friction of the brake pads during a braking action.

3. A mechanically ventilated disc brake rotor according to claim 1 wherein the centrifugal fan impeller which is housed in the hub of the disc brake rotor rotates at the same rotation speed with disc brake rotor under vehicle acceleration condition or cruising speed condition in which generates air flow via centrifugal action drawing intake air via double intake ports provided at both sides of the disc brake rotor and then forcing the air to flow radially outward through the inclined fixed vanes section enhancing the heat dissipation from the disc brake rotor.

4. A mechanically ventilated disc brake rotor according to claim 1 wherein the centrifugal fan impeller attached to the hub in between inboard and outboard brake disc with a single direction rotation ball bearing allows the centrifugal fan impeller to get engaged with the disc brake rotor when the disc brake rotor rotating in forward moving direction of the vehicle and thus allows the centrifugal fan impeller to gain angular momentum energy.

5. A mechanically ventilated disc brake rotor according to claim 4 wherein the centrifugal fan impeller continue rotating freely at the same initial rotation speed and direction with angular momentum effect whenever the disc brake rotor rotational speed reduces or stops rotating completely, due to deceleration of the vehicle or due to braking action.

6. A mechanically ventilated disc brake rotor according to claim 5 wherein the rotation of disc brake rotor gradually slows down, the single direction bearing disengages the centrifugal fan impeller from the brake rotor and allows the centrifugal fan impeller to continue rotating freely at the same initial rotational speed with the help of the angular momentum effect and continues forcing the air flow out thru fixed vanes passages by the centrifugal action.

7. A mechanically ventilated disc brake rotor according to claim 6 wherein the continues rotation of the centrifugal fan impeller allows continues heat dissipation from the disc brake rotor to remove the unwanted heat generated during braking action rapidly and effectively to sustain the disc brake rotor temperature generally at a lower operating range in order to maintain the performance of the braking system to an optimum level, especially under a frequent and harsh braking condition.

8. A mechanically ventilated disc brake rotor according to claim 7 wherein the continues rotation of the centrifugal fan impeller slows down gradually as the angular momentum energy level drops gradually and when the vehicle start to accelerate forward once again, the centrifugal fan impeller gets engaged with the disc brake rotor by the single direction ball bearing and start gaining the angular velocity and the angular momentum energy and gets ready for the following braking and cooling cycle.

9. A mechanically ventilated disc brake rotor according to claim 1 wherein operates on the basis of angular velocity and angular momentum energy gained from the rotation of the disc brake rotor and does not require any external energy source to rotate the centrifugal impeller fan.

10. A mechanically ventilated disc brake rotor according to claim 1 wherein operates only in a single direction rotation inline with the vehicle forward travel direction.

11. A mechanically ventilated disc brake rotor according to claim 1 wherein continue to operate as a conventional vented disc brake rotor in the event of failure of the single direction ball bearing or in the event where the centrifugal fan impeller gets jammed in position by ingress of any foreign object.

* * * * *